United States Patent [19]

Wiehn et al.

[11] Patent Number: 5,054,435
[45] Date of Patent: Oct. 8, 1991

[54] FURNACE, ESPECIALLY A FLUIDIZED FURNACE

[75] Inventors: Helmut Wiehn, Oberhausen; Heiko Rehwinkel, Bottropp; Horst Möllenhoff, Mülheim/Ruhr; Hans-Joachim Meier, Alpen-Menzelen, all of Fed. Rep. of Germany

[73] Assignee: Deutsche Babcock Werke Aktiengesellschaft, Oberhausen, Fed. Rep. of Germany

[21] Appl. No.: 550,463

[22] Filed: Jul. 10, 1990

[30] Foreign Application Priority Data

Jul. 11, 1989 [DE] Fed. Rep. of Germany ....... 3922765

[51] Int. Cl.$^5$ .............................................. F22B 1/00
[52] U.S. Cl. .................... 122/4 D; 110/245; 110/216
[58] Field of Search ................ 122/40; 110/245, 216

[56] References Cited

U.S. PATENT DOCUMENTS

| 4,712,514 | 12/1987 | Xu-Yi et al. | 122/4 D |
|---|---|---|---|
| 4,755,134 | 7/1988 | Engström et al. | 122/4 D |
| 4,756,257 | 7/1988 | Vind | 122/4 D |
| 4,809,623 | 3/1989 | Garcia-Mallol | 122/4 D |
| 4,856,460 | 8/1989 | Wied et al. | 122/4 D |
| 4,899,695 | 2/1990 | Brian et al. | 122/4 D |
| 4,929,255 | 5/1990 | Hukalin et al. | 122/4 D |
| 4,951,611 | 8/1990 | Abdulally et al. | 122/4 D |
| 4,955,295 | 9/1990 | Abdulally | 122/4 D |

Primary Examiner—Henry C. Yuen
Attorney, Agent, or Firm—Max Fogiel

[57] ABSTRACT

A furnace, especially a fluidized furnace with a combustion chamber (1) that gas flows up through and that has a gas outlet provided with a second flue (2) and a precipitator (10) for separating solids from the flue gas. The solids end of the precipitator communicates with the second flue, which accommodates a layer (12) of solid matter. The bottom of the second flue communicates by way of a solids-reintroduction line (14) with the combustion chamber. The second flue is a solids cooler and the precipitator is also a filter.

2 Claims, 4 Drawing Sheets

FURNACE, ESPECIALLY A FLUIDIZED FURNACE

BACKGROUND OF THE INVENTION

The invention concerns a furnace, especially a fluidized furnace.

In one known furnace (EP Patent 103 613) that is provided with a circulating fluidized bed, the solids are separated from the flue gas by spinning-particle collectors, collected in a hopper, and returned to the fluidized bed. The solid matter is not significantly cooled before returning to the bed because the hopper has no flue surfaces, with the exception of its walls, and because the solid matter is fluidized with just enough air to ensure uniform conveyance.

In another known circulation-based fluidized furnace (German Patent 2 624 302), the solid matter is kept in circulation, suspended at a high density in the flue gas and at a constant system temperature, by a system comprising a fludized-bed reactor, a cyclone precipitator, and a recirculation line. Some of the solid matter is removed from circulation and cooled in a separate flowing-bed cooler that is provided with flue surfaces and that has air flowing through it, with at least some of it being returned to the fluidized furnace.

Also known (BWK 40 [1988], pp. 273-76) is a furnace with a fluidized bed and boosted solid-matter circulation and with nested flue surfaces for cooling the flue gas and fly ash in the space above the bed.

The stagnant fluidized bed in another known furnace (VGB Kraftwerkstechnik 67, 8 [1987], pp. 571-77) has flue surfaces immersed in it. This furnace is operated under pressure, and the fluidized combustion chamber is accommodated in a pressurized vessel. The flue gas leaving the combustion chamber is forwarded to a gas turbine.

In the known fluidized furnaces a current of heat is released in the fluidized layer of solids and transmitted to the flue surfaces or along with the flue gas to the combustion chamber. The flue surfaces in furnaces with a stagnant fluidized bed are of the immersion type. Since the cross-section of the fluidized bed cannot be expanded without limits for reasons of design and process technology, the rate of fluidization will be relatively high at a given output. The immersion-type flue surfaces inside the bed are accordingly subjected to severe friction, which can wear down the material.

In fluidized beds with a boosted solids circulation and in circulating fluidized beds there is no need for immersion-type flue surfaces in the fluidized combustion chamber. The combustion chamber is instead provided with flue surfaces in the form of walls or partitions for the flue gas, heavily charged with particles, to flow over. The amount of gas that occurs will be dictated by the prescribed output. Since the flow cross-section cannot for reasons of design be as large as desired, the gas will flow at at least a minimum speed and, heavily laden with particles, will erode the surface of the walls and partitions.

When air is introduced discontinuously to extensively decrease the emissions of $NO_x$, the reducing conditions that will exist to some extent in the reactor will also corrode the flue surfaces, an attack that can be repulsed only by using high-quality materials.

Furnaces that are operated under pressure and have a stagnant fluidized bed are controlled by lowering the level of the bed as the load decreases. When the bed level is low, some of the immersion-type heating surfaces will extend out of it, and less heat will be diverted from it. The temperature, however, will decrease simultaneously, and gas will be supplied to the downstream turbine at a temperature that depends on the load.

SUMMARY OF THE INVENTION

The object of the present invention is to improve the generic furnace and avoid any drawbacks in relation to the design of the reactor and to eliminate wear and corrosion of the flue surfaces, such that the dimensions of the furnace, especially with respect to the ratio of the reactor's cross-section to its height, can be extensively freely selected and so that the temperature of the gas will be independent of the load.

Since the heat released by combustion is mostly extracted from the solid matter separated from the gas and since only cooled solid matter is returned to the furnace, the volumetric processes of heat delivery in the reactor, the later reaction in the afterburning section, and the cleaning of the flue gas and diversion of heat in the solids-cooling section are separated. These procedures can accordingly be varied without affecting the total process. The level and cross-section of any section of the furnace associated with one of these procedures can accordingly be freely selected. It becomes possible to decelerate the gas through the section with the wear-sensitive flue surfaces to the extent that they will not be significantly subjected to wear.

The solids that accumulate in the second flue in the cooling section will have been screened down to a small particle size in the combustion chamber and can accordingly be fluidized even at low gas rates. The high coefficient of heat transmission that derives from fluidization makes it possible to employ small flue surfaces. Since the atmosphere in the cooling section is not reducing, the flue surfaces can be made out of high-strength austenitic materials.

The wear-sensitive flue surfaces can be removed from the section where the gas must flow rapidly. Since the ratio of the furnace's cross-section to its height and hence the speed of the gas can be optimally established to allow the fuel to remain in the reactor and afterburning section long enough to burn completely, a wide range of coal sizes can be stoked. The amount of heat derived from the separated solid matter in the cooling section and the amount of excess air that remains in the reactor will dictate the temperature of the bed and hence of the gas for all levels of load. Afterburning can also be employed to elevate the temperature of the gas leafing the afterburning section to levels higher than those needed to operate a fluidized bed. Finally, how much solid matter is to be returned to the reactor can also be freely determined because the solids in the cooling section can be cooled to a prescribed temperature.

BRIEF DESCRIPTION OF THE DRAWINGS

Several embodiments of the invention will now be described by way of example with reference to the drawing, wherein.

DESCRIPTION OF THE PREFERRED EMBODIMENTS

Figure 1:
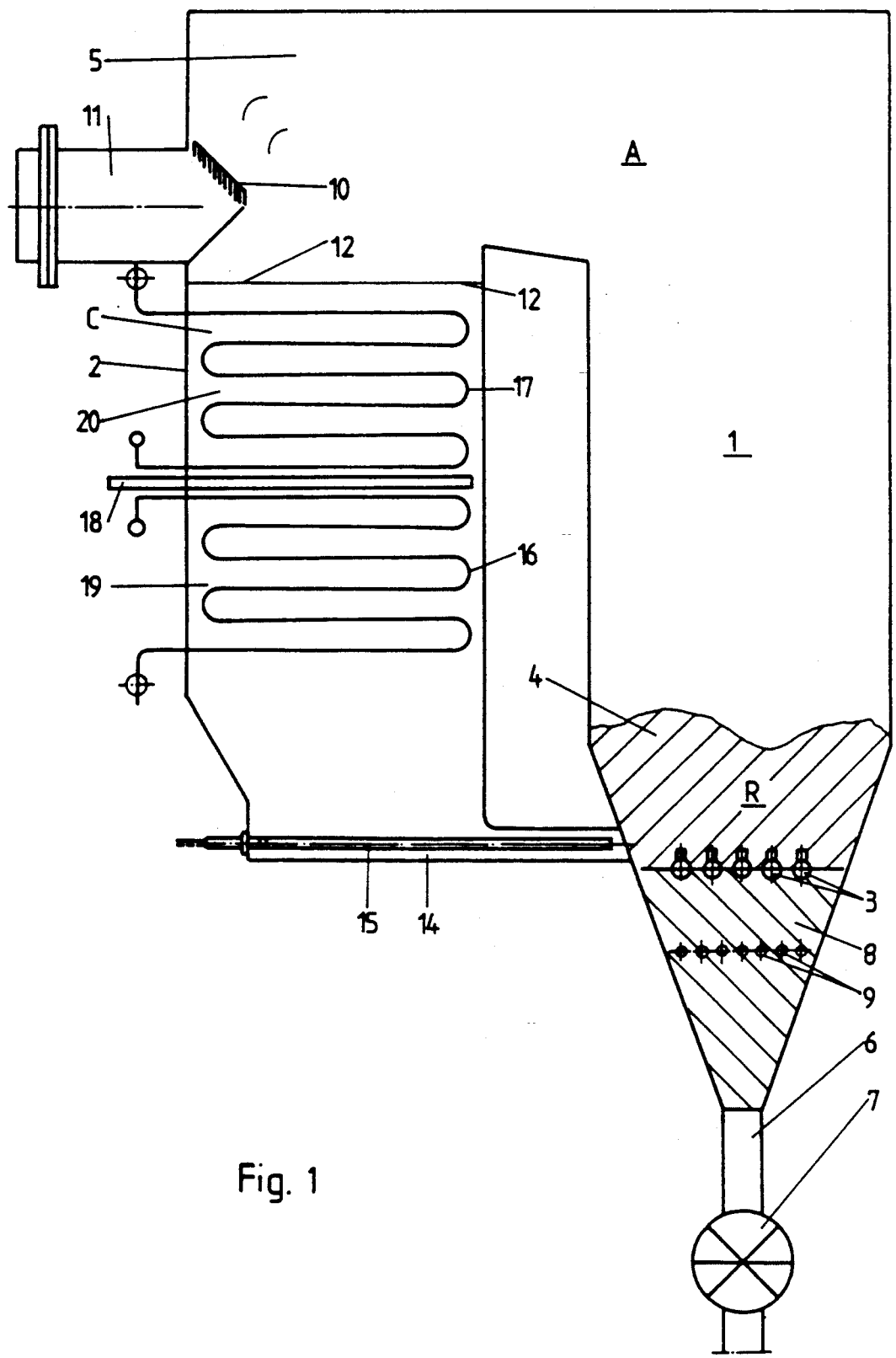
FIG. 1 is a schematic representation of a fluidized furnace.

Combustion is carried out in a combustion chamber 1 that has gas flowing up through it and communicates through a horizontal flue 5 with another flue 2. Combustion chamber 1 and second flue 2 are separated by partitions, preferably partitions made of pipes welded together gas-tight.

A solid, liquid, or gaseous fuel is supplied to the bottom of combustion chamber 1 through unillustrated lines. The furnace can have a stagnant or circulation-type fluidized bed or it can be a forwarding reactor that uses current-floating combustion. The furnace comprises a reactor section R that merges into an afterburning section A. Afterburning section A terminates upstream of a precipitator 10. Precipitator 10 is downstream of where combustion chamber 1 joins second flue 2. Extra combustion air and, if necessary, fuel is supplied to afterburning section A. Second flue 2 includes a cooling section C.

The invention will now be explicated by way of the example of fluidized furnace. The furnace comprises a fluidized bed packed with extra circulating solids. The description that now follows is also intended to apply to a heavy-circulation fluidized bed or to a powdered-fuel furnace that recirculates solids.

The bottom 3 of combustion chamber 1 is provided with nozzles that inject air for both combustion and conveyance. Enough air is supplied rapidly enough to create a fluidized bed 4, preferably with a well-defined upper surface, above nozzled bottom 3. The fluidized bed 4 represents reactor section R.

Below nozzled bottom 3, combustion chamber 1 has an ash extractor 6 with an extraction mechanism 7, a rotary thruster for example. Between nozzled bottom 3 and extraction mechanism 7 is a stagnant layer 8 of ash. Inside the layer are nozzles 9 that inject a gaseous fluid, air or flue gas for example, into the ash. The gas arrives in combustion chamber 1 along with the fluidization air from nozzled bottom 3.

The air entering through nozzled bottom 3 induces an upward current of flue gas and entrained particles. Downstream of where combustion chamber 1 communicates with second flue 2 is a precipitator 10. The gas-end outtake from precipitator 10 communicates with a gas-exhaust line 11 that communicates in turn with a plant for further processing the flue gas. This further-processing plant can be either an exhaust-heat exploiting boiler or a gas turbine if the fluidized furnace is operated at a pressure of 20 bars for example as will now be described.

Figure 2:
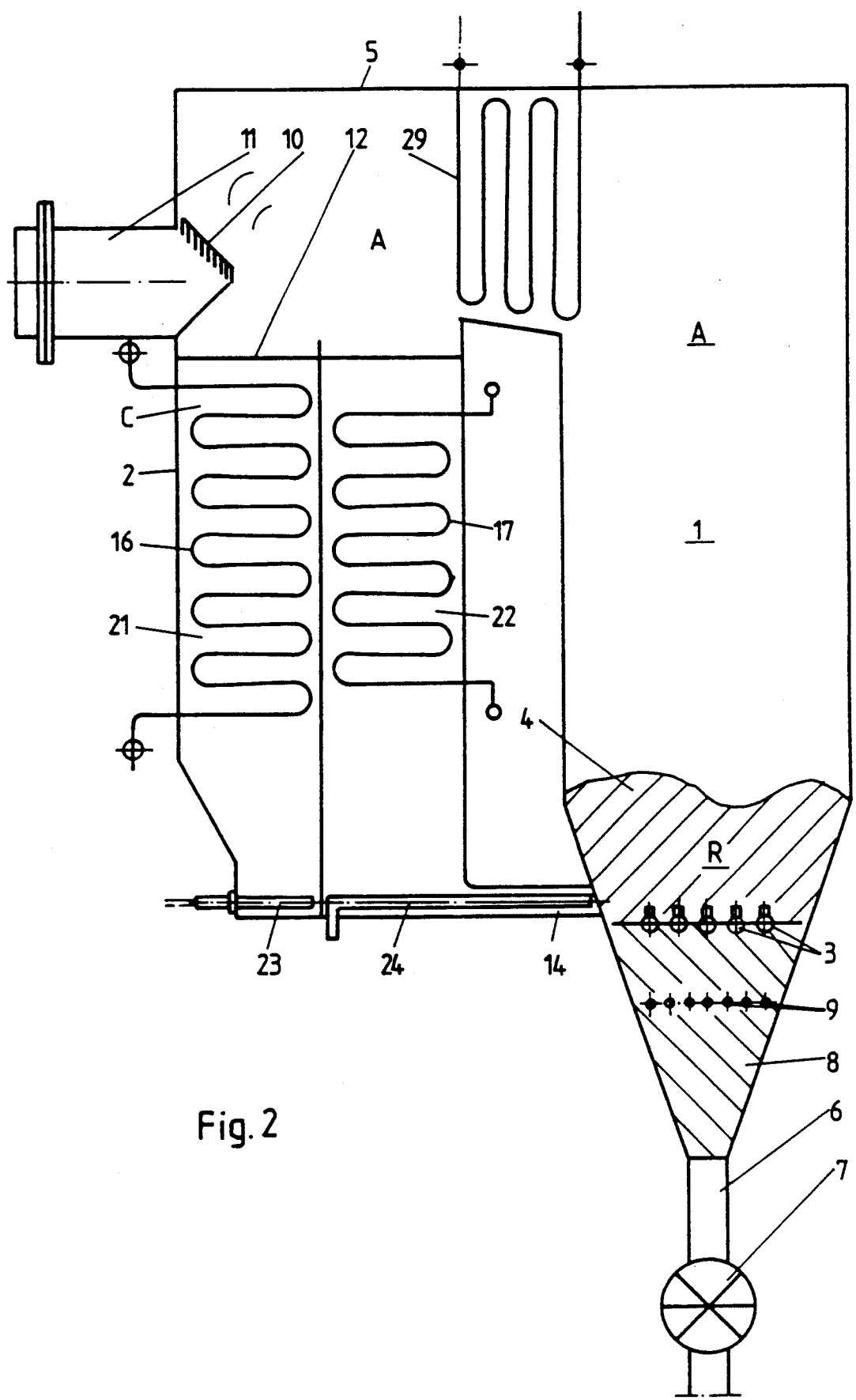
FIG. 2 is a schematic representation of another type of fluidized furnace.

Precipitator 10, which is illustrated only schematically in FIGS. 1 and 2, is also a filter. Its solids outtake extends into second flue 2. The use of precipitators of this type to clean flue gas from fluidized furnaces is known (VDI Berichte 715 [1989], 289–322 and especially 299–309 & 315–17). The are distinguished for thorough precipitation.

The precipitator can be a bulk-bed filter, which is a sloping and perforated base that supports a filter bed of granulated material, silica sand for example. The filter bed can also be built up out of material obtained from fluidized bed 4. The particles that settle on the filter bed as the flue gas travels through it is blown off occasionaly and arrives in second flue 2, wherein a layer 12 of solid matter accordingly accumulates.

Figure 3:
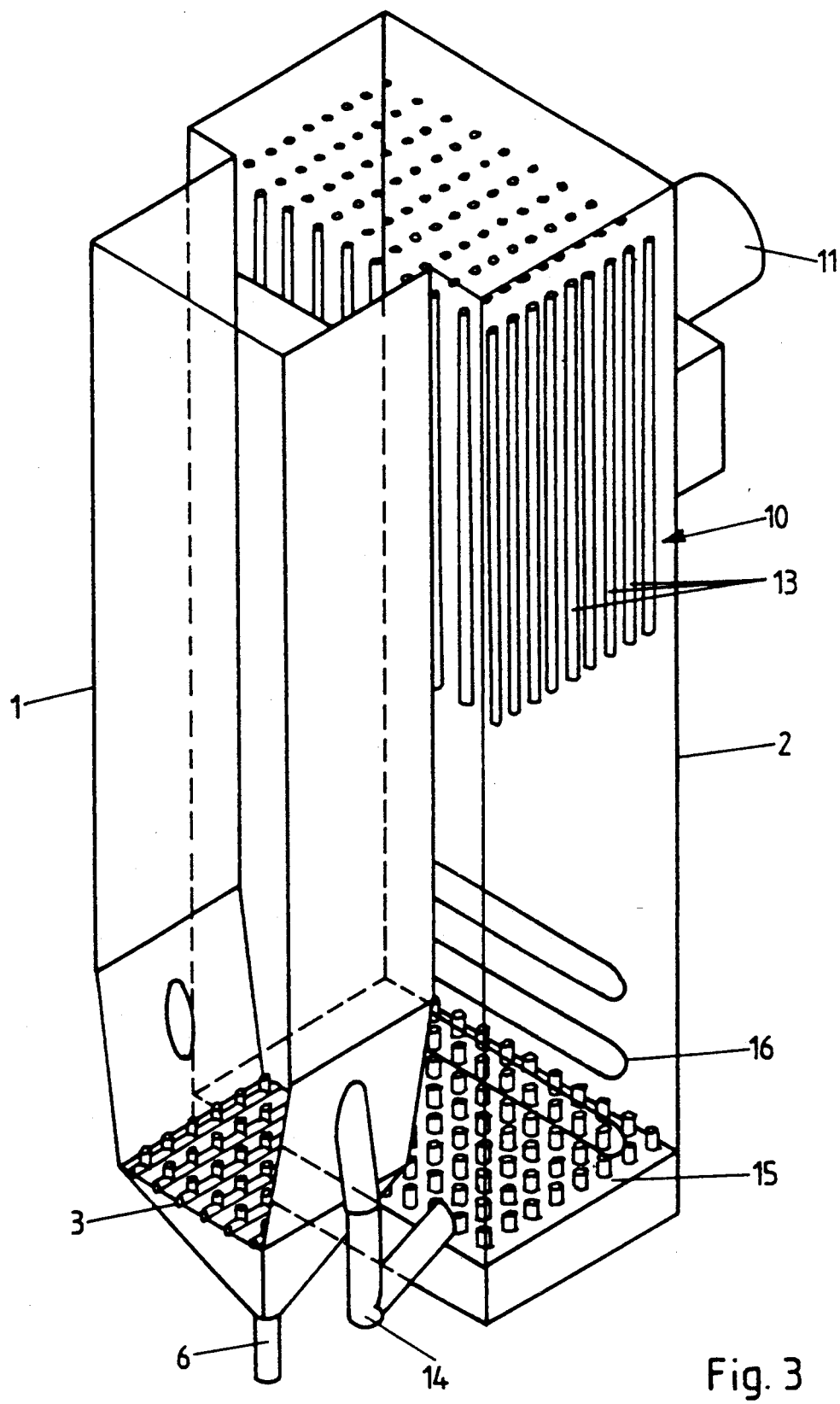
FIG. 3 is a perspective drawing of another type of fluidized furnace.

A multiple-tube filter, however, is preferable to a bulk-bed filter. A multiple-tube filter is illustrated in FIG. 3. It consists of several tubes 13 of porous ceramic secured in a holder in second flue 2. The particle-charged gas flows through the porous filter material and arrives at the clean side in gas-exhaust line 11. The solid matter precipitates on the gas side of tubes 13 and either drops off automatically as the layer thickens or is flushed back into second flue 2, where it creates layer 12.

The bottom of second flue 2 communicates by way of a solids-reintroduction line 14 with combustion chamber 1 above nozzled bottom 3. At the bottom of second flue 2 is an array 15 of nozzles that injects air into layer 12 of solid matter. Another gas, reintroduced flue gas for example, can be employed instead of air. One it has flowed through layer 12 of solid matter, this air or gas is removed along with the flue gas from combustion chamber 1 through precipitator 10 and gas-exhaust line 11. The air can also be injected in the form of secondary combustion air into afterburning section A with an ejector for example.

Inside the layer 12 of solid matter is second flue 2 are flue surfaces 16 and 17. A liquid or gaseous heat-exchange fluid—gas, air, steam, water, heating oil, or liquid metal—flows through the flue surfaces. The flue surfaces can be connected, along with the piping in the walls of second flue 2 and combustion chamber 1 to a steam-circulating system.

Second flue 2 can be divided by additional arrays 18 of nozzles into two or more compartments 19 and 20 one on top of another. Second flue 2 can also be divided by one or more vertical partitions into sevral adjacent compartments 21 and 22. The partitions can either be uncooled or made out of pipes welded together gas-tight. Each adjacent compartment has its own array 23 and 24 of nozzles. Each compartment 19, 20, 21, and 22 also has its own flue surface 16 and 17 that can be interpolated as either the economizer, the evaporator, or the superheter in a steam-circulation system.

The solids in the layer 12 inside second flue 2 are cooled by releasing heat to the air or other gas that is flowing through the flue and to the heat-exhange fluid flowing through flue surfaces 16 and 17. All or part of the solids separated in precipitator 10 and cooled in second flue 2 is reintroduced into combustion chamber 1. The temperature in combustion chamber 1 is accordingly maintained at 750° to 900° C. and preferably at 850° C. by diverting the heat released by the combustion of the fuel with air to the heat-exchange fluid in the walls that demarcate combustion chamber 1 and to the cooled and reintroduced solid matter. The flue gas, when as is preferred there are no flue surfaces in afterburning section A, enters precipitator 10 at the same temperature as the fluidized bed. It is also possible to prevent complete combustion by decreasing the amount of air in combustion chamber 1, in which event the gas leaving fluidized bed 4 will contain still combustible components. The temperature of the flue gas leaving gas-exhaust line 11 can in this way be raised to above the temperature of the bed, to 1000° C. for example. The air to support combustion in afterburning section A is the same air that flows through layer 12 of solid matter. Secondary and tertiary combustion air can also optionally be injected into afterburning section A along with additional fuel. This approach is practical when the fluidized furnace is to be operated under pressure.

If the air or gas is injected into layer 12 of solid matter at a rate below the rate of fluidization, the bed will be stagnant. If it is injected at a rate above the fluidization rate, the bed will be turbulent. Since the coefficient of heat transmission of a turbulent bed is essentially higher than that of a stagnant bed, the rate can be adjusted in the vicinity of the fluidization rate of the air flowing through layer 12 of solid matter to control the distribution of the heat extracted from the solid matter to the air and to the heat-exchange fluid in flue surfaces 16 and 17. An attempt must be made to attain a stagnant bed in order to transfer the heat to the air or gas as preferred. If more heat is to be transmitted to the fluid in flue surfaces 16 and 17, layer 12 of solid matter must be fluidized. The distribution of heat can be controlled to advantage by the aforesaid division of second flue 2 into several compartments 19, 20, 21, and 22. It is also possible to maintain a stagnant bed in one compartment and a turbulent bed in another.

Flue surfaces 29 that come into contact with the flue gas can also be positioned downstream of reactor section R between combustion chamber 1 and second flue 2 in afterburning section A. The cross-section can be adjusted to prevent the gas from flowing too rapidly at this point.

The aforesaid furnace can be operated at a pressure slightly higher than atmospheric, eliminating the need for a suction flue. A pressure higher than 1 bar to 30 bars and preferably 20 bars can also be established in combustion chamber 1 and second flue 2. In this event the cleaned gas entering gas-exhaust line 11 will be depressurized in a gas turbine or employed for chemical processing.

Figure 4:
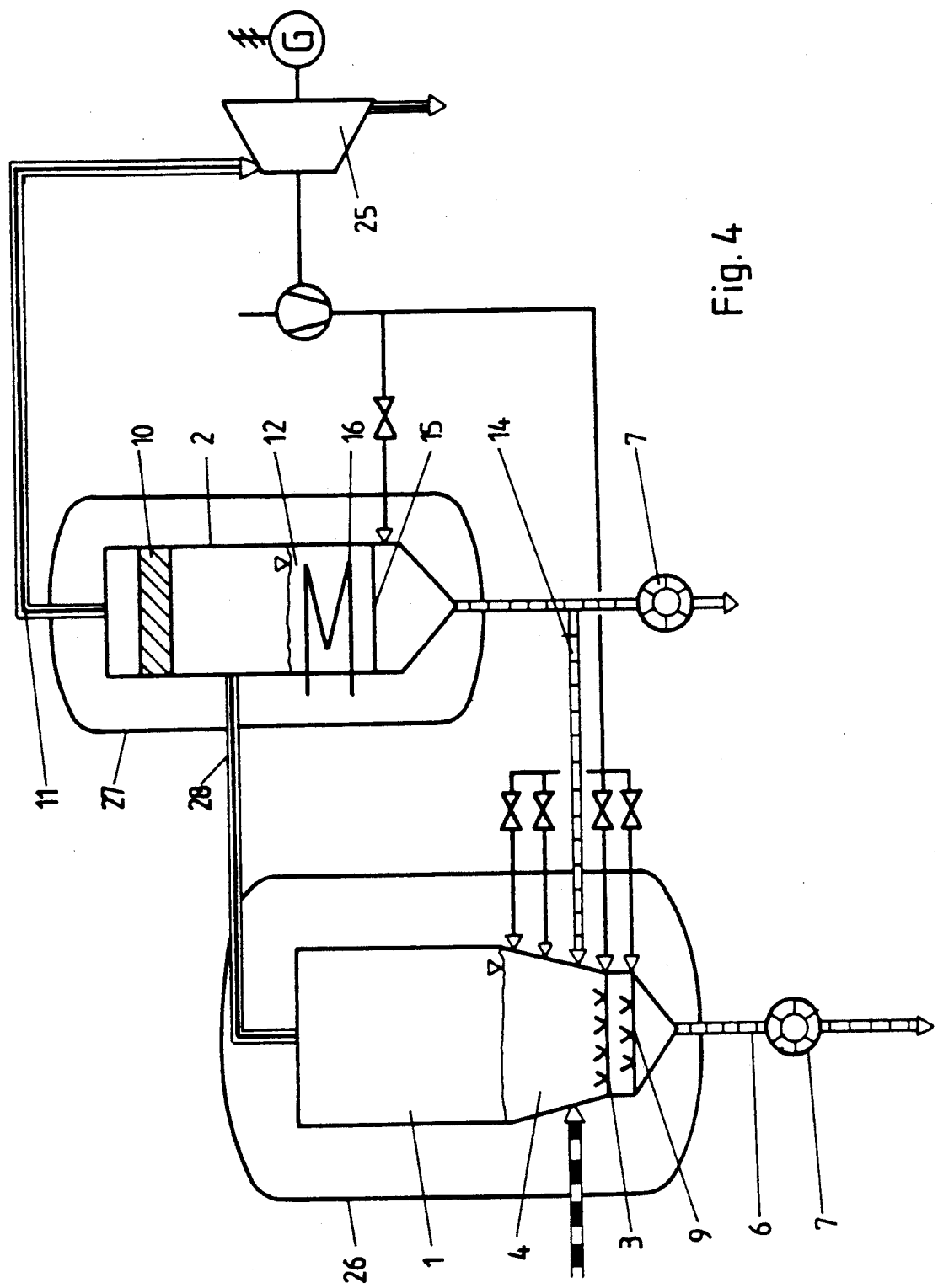
FIG. 4 is a flow chart of another type of fluidized furnace that is operated under pressure.

FIG. 4 illustrates a specific furnace that is operated under pressure. The combustion chamber 1 and second flue 2 in this furnace are accommodated in separate pressurized vessels 26 and 27. A pressure line 28 extends through the vessels and connects combustion chamber 1 to second flue 2. Gas-exhaust line 11 communicates with a gas turbine 25. In departure from the illustrated embodiment, combustion chamber 1 and second flue 2 can also be accommodated in one pressurized vessel. Otherwise, the pressure-subject embodiment illustrated in FIG. 4 is basically similar to the fluidized furnace operated under atmospheric or higher pressure and illustrated in FIGS. 1 to 3.

We claim:

1. A furnace, particularly a fluidized bed furnace, comprising: a combustion chamber with gas flowing up from below, said combustion chamber having an outlet; a flue connected to said outlet; a precipitator connected to said outlet for separating solids from flue gas of the furnace; said precipitator comprising a filtering precipitator having a solids exit communicating with said flue; said flue comprising a solids cooler for separated solids; said solids cooler having a lower end; and a solids feedback line between said lower end of said solids cooler and said combustion chamber; said flue having flue surfaces with a heat-exchange fluid flowing through said flue surfaces; said solids having air flowing therethrough; gas flowing through said solids at a rate adjusted to control distribution of heat to be diverted between the gas and said flue surfaces; said flue being divided into compartments, each compartment having a separate gas supply source; means for injecting fuel and combustion air for generating a reactor section at a bottom of said combustion chamber; means for injecting additional combustion air to generate an after-burning section extending from said reactor section to an intake of said precipitator; said after-burning section having a temperature held substantially higher than the temperature in said reactor section; air flowing through said solids being supplied as combustion air to said after-burning section; means for supplying additional fuel to said after-burning section; said combustion chamber and said flue having a pressure for operating a gas turbine; separate pressurized vessels for holding said combustion chamber nd said flue; a pressure line between said combustion chamber and said flue; and flue surfaces suspended in a flow of gas downstream of said reactor section.

2. A furnace, particularly a fluidized bed furnace, comprising: a combustion chamber with gas flowing up from below, said combustion chamber having an outlet; a flue connected to said outlet; a precipitator connected to said outlet for separating solids from flue gas of the furnace; said precipitator comprising a filtering precipitator having a solids exit communicating with said flue; said flue comprising a solids cooler for separated solids; said solids cooler having a lower end; and a solids feedback line between said lower end of said solids cooler and said combustion chamber; said flue having flue surfaces with a heat-exchange fluid flowing through said flue surfaces; said solids having air flowing therethrough; gas flowing through said solids at a rate adjusted to control distribution of heat to be diverted between the gas and said flue surfaces; said flue being divided into compartments, each compartment having a separate gas supply source; means for injecting fuel and combustion air for generating a reactor section at a bottom of said combustion chamber; means for injecting additional combustion air to generate an after-burning section extending from said reactor section to an intake of said precipitator; said after-burning section having a temperature held substantially higher than the temperature in said reactor section; air flowing through said solids being supplied as combustion air to said after-burning section; said combustion chamber and said flue having a pressure for operating a gas turbine; separate pressurized vessels for holding said combustion chamber and said flue; a pressure line between said combustion chamber and said flue; and flue surfaces suspended in a flow of gas downstream of said reactor section.

* * * * *